May 18, 1926.
G. SAUNDERS
CLUTCH
Filed Jan. 9, 1922
1,585,172
3 Sheets-Sheet 1
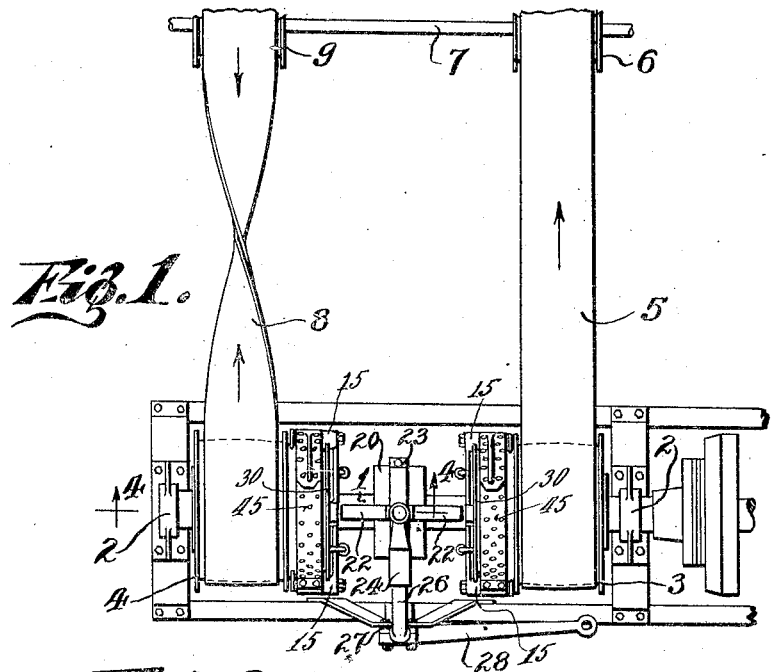

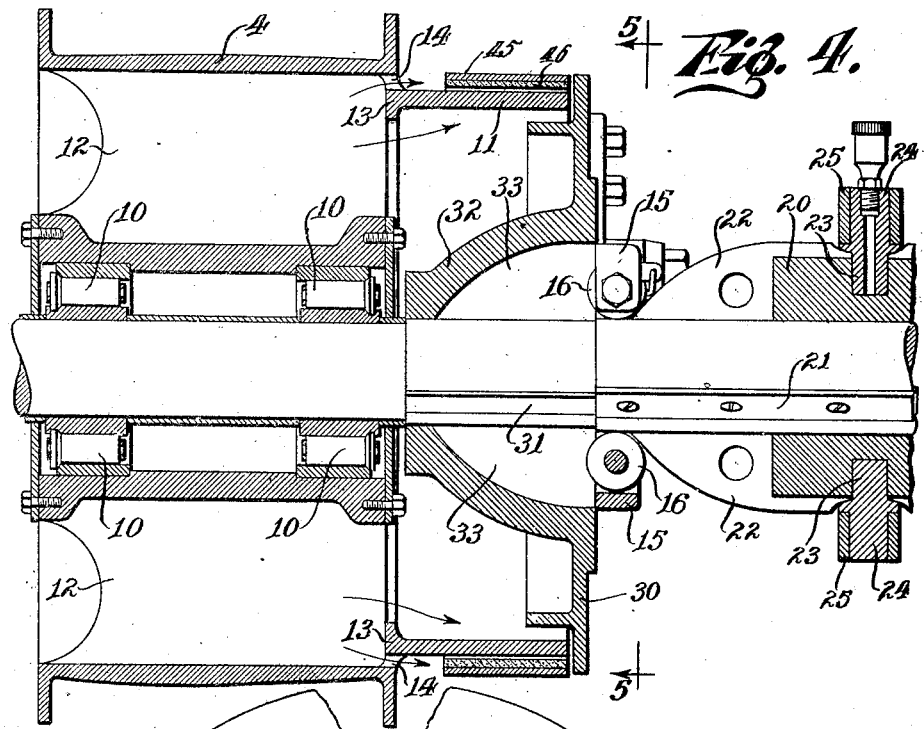
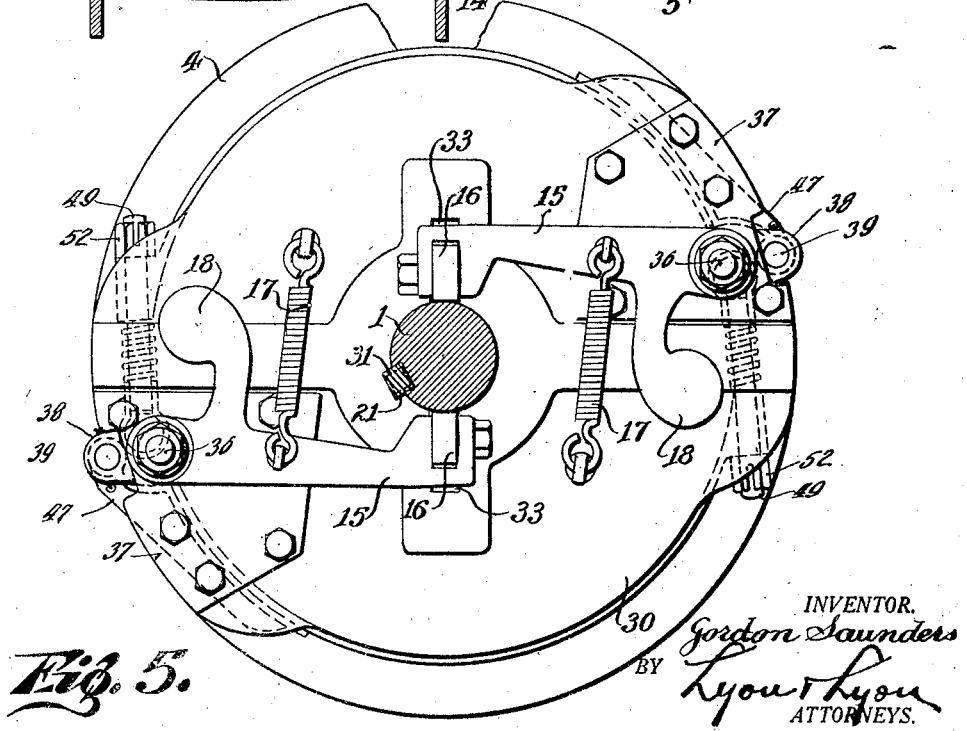

May 18, 1926.

G. SAUNDERS

CLUTCH

Filed Jan. 9, 1922  3 Sheets-Sheet 3

1,585,172

INVENTOR.
Gordon Saunder
BY Lyon & Lyon
ATTORNEYS.

Patented May 18, 1926.

1,585,172

UNITED STATES PATENT OFFICE.

GORDON SAUNDERS, OF WHITTIER, CALIFORNIA.

CLUTCH.

Application filed January 9, 1922. Serial No. 527,984.

This invention relates to clutches and is particularly directed to friction clutches adapted for high speed power drives.

An object of the invention is to provide an improved type of band clutch including a clutch band having no fixed point of support and in which all parts of the band have a movement to and from the cooperating clutch drum; also to provide improved means for supporting the ends of the clutch bands in such a way as to insure that they will be held entirely clear of the drum with which they cooperate. When the device includes a shackle for supporting the ends of the clutch band, one of the objects of the invention is to construct this shackle so as to provide an effective support for its rock shaft and so that it will afford an improved means for attaching the ends of the band.

Another object is to provide a clutch of the above character in which the clutch band is positively held out of contact with the clutch drum throughout its entire circumference when the clutch is thrown out.

A further object is to provide means for cooling the clutch.

Further objects of the invention will appear hereinafter.

Various other objects and advantages will be more fully apparent from the following description of the accompanying drawings which form a part of this disclosure, and which illustrate a preferred embodiment of the invention.

Of the drawings:

Fig. 1 is a plan view showing a power mechanism in which my improved clutch is incorporated.

Fig. 2 is an enlarged side elevation thereof.

Fig. 3 is a detail section on line 3—3 of Fig. 2.

Fig. 4 is an enlarged longitudinal section on line 4—4 of Fig. 1.

Fig. 5 is a transverse section on line 5—5 of Fig. 4.

Figure 6:
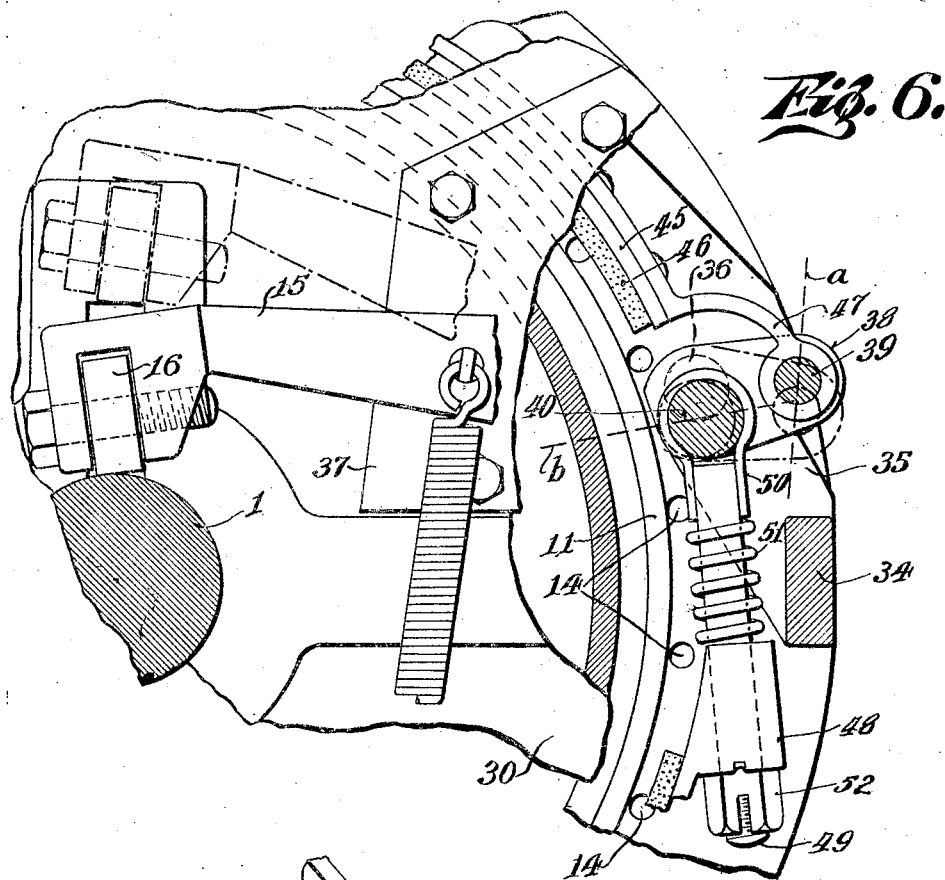
Fig. 6 is an enlarged portion of Fig. 5 partly broken away to more clearly illustrate certain details of construction.

The mechanism illustrated in the drawings is especially adaptable as a power drive for oil well equipment and for cooperation with a high speed power unit such as an internal combustion engine, the general arrangement of the mechanism including a drive shaft 1 journaled in bearings 2 carried by a supporting frame. The drive pulleys 3 and 4 revolve loosely on the shaft and clutch bands and associated operating mechanism rotate with the shaft, the clutches alternately engaging the pulleys to cause one or the other to rotate with the shaft. In one arrangement the forward drive pulley 3 is connected by a straight belt 5 with a pulley 6 on a driven shaft 7, and the reverse drive pulley 4 is connected by a crossed belt 8 with a pulley 9 on the shaft 7. Referring particularly to Fig. 4 it will be seen that each of the pulleys 3 and 4, which are of duplicate construction, is journaled on the shaft 1 on roller bearings 10 and has an axially projecting clutch drum 11 with which the clutch band cooperates.

It will be understood that as each of the clutch bands rotate with the shaft, when one of the pulleys 3 or 4 is clutched in to rotate with the drive shaft 1, the opposite drive pulley will, through its driving connection with the driven shaft 7, be rotated in a reverse direction at an equal speed, the resulting difference in relative speed of rotation of the inactive clutch band and its companion idle clutch drum will be twice the speed of the driven shaft.

Under such conditions, even with the clutch band which is held normally free from contact with its companion clutch drum, it is desirable that some means be provided for cooling the clutch, especially as in equipment of the character illustrated the drive shaft has a speed of upwards of 500 revolutions per minute.

In the present instance the pulleys 3 and 4 have radial fins 12 and the inner web 13 has a series of axially disposed openings 14 positioned exterior of the drum 11 and adjacent the outer periphery thereof.

By this construction the fins 12 propel the air within the pulley and by centrifugal action it is forced to the inner periphery of the pulley where it escapes axially through the interior of the drum 11 and through the openings 14, as indicated by the arrows in Fig. 4, and serves to cool the drum and the clutch band.

The respective clutch bands are of two part construction, as will later be described in detail, and each part thereof is operated by a clutch operating arm 15 which extends inwardly and has journaled in its inner end a roller 16 which normally is held against the drive shaft 1 by a spring 17, each arm 15 having a weight limb 18 serving to neutralize any tendency of the arm to independently move under the influence of centrifugal action.

The mechanism utilized for alternately throwing in the opposed clutches, comprises a medially grooved sleeve 20 splined to the shaft 1 by a key 21 and adapted to slide axially in its clutch operating movements. The sleeve 20 carries pairs of opposed clutch operating cam plates 22 which align with the rollers 16 of the companion clutch operating arms 15, (see Fig. 4) and the groove of the sleeve is engaged by a split ring member 23 (see Figs. 3 and 4) having oppositely disposed pins 24 journaled in the opposite furcations of a yoke member 25, said yoke member being mounted on the inner end of a lateral shifting lever 26 having its vertical limb journaled in a bracket 27 as part of the frame of the machine. A link 28 is connected with said vertical limb of the shifting lever and may be connected with any suitable form of manual or automatic manipulating means.

With this organization of parts the sleeve 20 may be translated axially in either direction to throw in either of the clutches, the appropriate clutch being thrown in by the cam plates 22 engaging the rollers 16 and forcing the arms 15 radially outward, this action, as will be explained, causing the associated clutch band to grip the companion clutch drum 11. I provide a shackle or preferably two shackles, and connect one end of the clutch band or clutch band segments to the shackle so that it moves circumferentially and inward toward the drum, and I provide means for connecting the dead end or ends at a point substantially the same distance as the rocking axis from the axis of the drum. I shall now describe means for accomplishing this.

Figure 7:
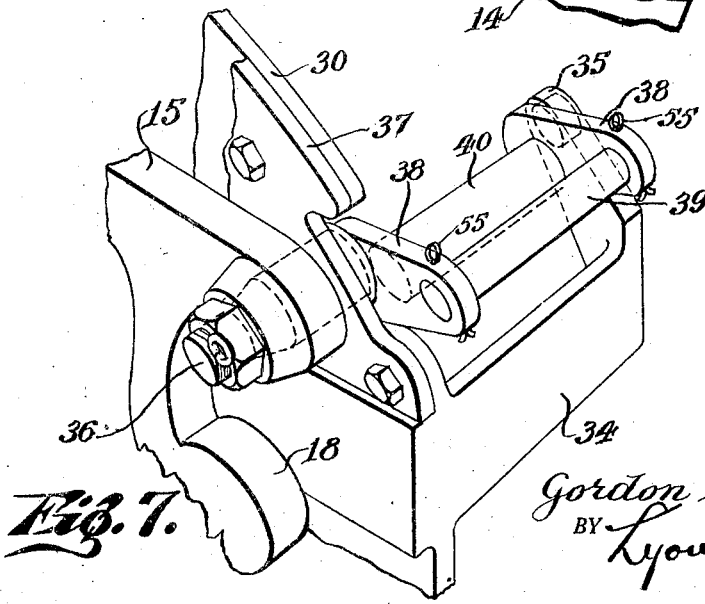
Fig. 7 is a perspective view illustrating the clutch band carrying and operating means.

The clutch band and its operating means is carried on a rotary member, or disc 30 keyed to the shaft 1 by a key 31 and provided with a hub 32 having diametrically opposite recesses 33 to accommodate the cam plates 22 (see Figs. 4 and 5). At diametrically opposite locations said disc has lateral webs or brackets 34, each terminating with an inwardly projecting extension 35, (see Fig. 7) each of said extensions serving as one journal bearing for a stub-shaft or rock-shaft 36 upon the outer end of which the companion clutch operating arm 15 is rigidly secured, so that the arm extends radially from the rock shaft, and inwardly toward the central part of the drum. In the present instance disc 30 in the region of each shaft 36 is cut away and a detachable plate 37 secured to the disc forms the opposite journal bearing for the shaft. Each shaft 36 rigidly carries a toggle or shackle comprising two outwardly extended relatively spaced arms 38 in the outer ends of which is secured a transverse stud 39, and inwardly of said stud the shaft has an eccentric wrist portion or pin 40. The two semi-circular clutch bands are of duplicate construction each comprising the metal band 45 to which is secured by rivets or otherwise a clutch lining 46 of asbestos or of other suitable material. To one end of each band 45 is secured a bracket 47 journaled on the stud 39 of one of the shaft members 36 and to the opposite end of said band 45 is secured a bracket 48. Said bracket 48 is provided with two relatively spaced bolts 49, each connected by a yoke 50 to the eccentric portion or pin 40 of the toggle shaft 36. Springs 51 surround the respective bolts 49 between the yokes or pivot members 50 and the brackets 48, and the ends of said bolts are engaged by adjusting nuts 52 by which the degree of clamping action of the clutch band upon the clutch drum may be regulated.

In Fig. 6 the clutch operating arm 15 and the shaft 36 are shown in normal releasing position in full lines, and in clutching position in dotted lines. It will be noted that during a clutching operation that the stud 39 travels circumferentially, that is, in a general tangential direction, but inwardly relative to the clutch drum as indicated by the dotted line $a$; this pulls one end of the clutch band circumferentially and inwardly, and the eccentric portion or pin 40 of the shaft 36 travels approximately in a direction radial relative to the drive shaft, as indicated by the dotted line $b$, which brings the opposite end of the clutch band towards and against the clutch drum.

The pin 40 is at substantially the same distance from the axis of the drum as the shaft 36; that is to say, it is substantially on the same circumferential line as the axis of the shaft 36, with reference to the center of the drum; hence the line or direction of pull of this end of the clutchband is substantially in line with the axis of the rock shaft 36. This tends to keep the shackle from chattering or vibrating when in use.

From consideration of this structure and operation it will be evident that the present invention provides a clutch band having no fixed point of support as both semi-circular clutch band units are carried, at one end by one of the movable studs 39 and at the opposite ends by the movable eccentric portions 40 of the shafts 36. Also it will be evident that the clutch band units are bodily translated to and from the clutch drum and that one end of each unit is moved circumferentially and inwardly and the other moved radially relative to the drive shaft.

The provision of the detachable plates 37 contributes to a convenient and rapid removal of the shaft 36 of the toggles or shackles. Such removal is accomplished by first removing the nuts 52 from the bolts 49 after which the plates 37 are detached from the disc 30, this permitting the shaft 36 together with the arms 15, plate 37 and clutch bands 45 to be removed as a unit.

The use of the bracket 34 is most advantageous because it enables the toggle shaft to be supported at both ends with the points of attachment of the bands located between the supporting points.

If it is desired to remove only the clutch bands, this may be accomplished by first withdrawing the cotter pins 55 and then removing the stud 39 to release one end of such clutch band. By removing the adjusting nuts 52 the opposite end of the respective band is released and the band may then be removed for repair or replacement.

The form of mechanism here shown and described, while well adapted to fulfill the objects primarily stated, is susceptible of embodiment in various other forms without departing from the broad scope of the present invention, therefore, it is not intended to confine the invention to the one form of embodiment herein illustrated and described as it contemplates all such modifications as come within the scope of the following claims.

What is claimed is as follows:

1. In a device of the class described, a shaft, a driving member carried thereby, a driven clutch-drum, a clutch-band mounted to cooperate with the drum, a shackle having a rock-shaft, an arm attached to the rock-shaft and extending inwardly toward the shaft, means for attaching the live end of the clutch-band to the shackle at the side of the rock-shaft remote from the shaft, means for attaching the dead end of the clutch-band to the shackle between the point of attachment of the said live end and the drum, and a spring cooperating with the last named attaching means at the dead end of the band for normally holding the clutch-band off of the drum, and means for moving the arm to actuate the shackle and tighten the clutch-band on the drum.

2. In a device of the class described, a driving member, a driven clutch drum, a clutch band adapted to grippingly engage the drum and comprising two substantially semi-circular units, and means associated with the adjacent ends of the units and functioning to move the end of one unit circumferentially and inwardly and the end of the opposite unit substantially radially and toward the clutch drum, and a spring connected with the dead end of each unit for holding the dead ends out of contact with the drum when the band is loose.

3. In a device of the class described, a driving member, a driven clutch drum, opposed rocking members carried by the driving member, each having a stud movable circumferentially and inwardly, and an eccentric pin near the axis on which the rocking member rocks, and movable radially relative to the drum, said pins being at substantially the same distance as said rocking axes from the axis of the drum and a pair of semi-circular clutch band units each carried by the stud of one rocking member and the eccentric pin of the opposite rocking member whereby the dead end of each clutch band unit is moved substantially radially into and out of gripping engagement with the drum, and the pull in the dead end of each band is exerted substantially in line with the axis on which the rocking member rocks.

4. In a clutch, the combination of a driven clutch drum, a rotary member adjacent the drum and having a laterally projecting bracket with an arm at the outer end thereof, a shackle mounted on a rocking axis in the rotary member and the said arm, said shackle having a pair of oppositely disposed arms with a connecting stud therebetween, said shackle also having an eccentric pin near the rocking axis of the shackle and at substantially the same distance as the rocking axis from the axis of the drum, a clutch band having one end attached to the stud and having its dead end attached to the eccentric pin, said stud and pin being located so that when the shackle is rocked on its axis the first named end of the clutch band moves circumferentially and toward the drum and the dead end of the band moves substantially radially inwardly against the face of the drum.

5. In a clutch, the combination of a driven clutch drum, a rotary member adjacent the drum, said rotary member having a pair of oppositely disposed shackles, each shackle having an axis of rotation on the rotary member near the face of the drum and on which it may rock, and each shackle further having an outwardly projecting arm carrying a stud, and an eccentric pin disposed at substantially the same distance as the rocking axis from the axis of the drum, a substantially semi-circular clutch band attached at one end to the stud of one shackle and at its dead end to the pin of the other shackle, and a second clutch band having its dead end attached to the remaining pin of one shackle and the remaining stud of the other shackle, and means for applying a rocking force to the shackles whereby the stud of each shackle pulls its adjacent end of the clutch bands circumferentially and against the face of the drum, and each eccentric pin moves its corresponding dead end substantially radially inwardly against the face of the drum.

6. In a clutch, the combination of a driven clutch drum, a rotary member adjacent the drum, a shackle mounted to rock on an axis near the face of the drum having outwardly projecting arms carrying a stud and an eccentric pin, said rocking axis and said eccentric pin being located between the stud and the axis of the drum, a clutch band having its live end attached pivotally to said stud and means including an adjusting bolt attached to the dead end of the band and pivotally attached to the eccentric pin, whereby when the shackle is rocked on its rocking axis the live end of the band is moved substantially in a circumferential direction and the dead end of the band is moved inwardly substantially radially towards the axis of the drum, and means including a part mounted to move longitudinally along the axis of the drum, for actuating the shackle.

Signed at Los Angeles, California, this 13th day of December, 1921.

GORDON SAUNDERS.